United States Patent [19]

Moore

[11] 4,271,015
[45] Jun. 2, 1981

[54] WATER TREATMENT APPARATUS

[76] Inventor: Roger S. Moore, 1990 Olivera Rd., Concord, Calif. 94520

[21] Appl. No.: 5,312

[22] Filed: Jan. 22, 1979

[51] Int. Cl.³ .............................................. B01D 27/02
[52] U.S. Cl. .................................... 210/94; 210/282; 210/443
[58] Field of Search ............... 137/625.29, 87; 210/85, 210/91–94, 181, 232, 240, 283–287, 418, 424, 451–453, 282, 288, 443; 55/91, 274

[56] References Cited

U.S. PATENT DOCUMENTS

| | | | |
|---|---|---|---|
| 1,917,121 | 7/1933 | Hughson | 210/94 |
| 2,325,657 | 8/1943 | Burkness | 210/94 |
| 3,342,335 | 9/1967 | Gamundi et al. | 210/282 X |
| 3,358,836 | 12/1967 | Schmitt | 210/91 X |
| 3,428,089 | 2/1969 | Kachergis | 137/625.29 |
| 3,439,809 | 4/1969 | McPherren | 210/283 X |
| 3,681,562 | 8/1972 | Winzen | 210/94 |

Primary Examiner—Ivars C. Cintins
Attorney, Agent, or Firm—B. Deon Criddle

[57] ABSTRACT

An apparatus for the treatment of water. A water filter is mated with a housing base and cover to form an integral unit to treat water. A valve connected to a water faucet diverts the flow of water from the tap through a filter inlet tube, through the filter and back to the valve via a filter discharge tube. A second position on the valve permits the water flow from the faucet to by-pass the treatment filter. The replaceable filter has indicator means to visually indicate whether or not satisfactory flow is being maintained through the unit and whether or not the filter should be changed.

4 Claims, 8 Drawing Figures

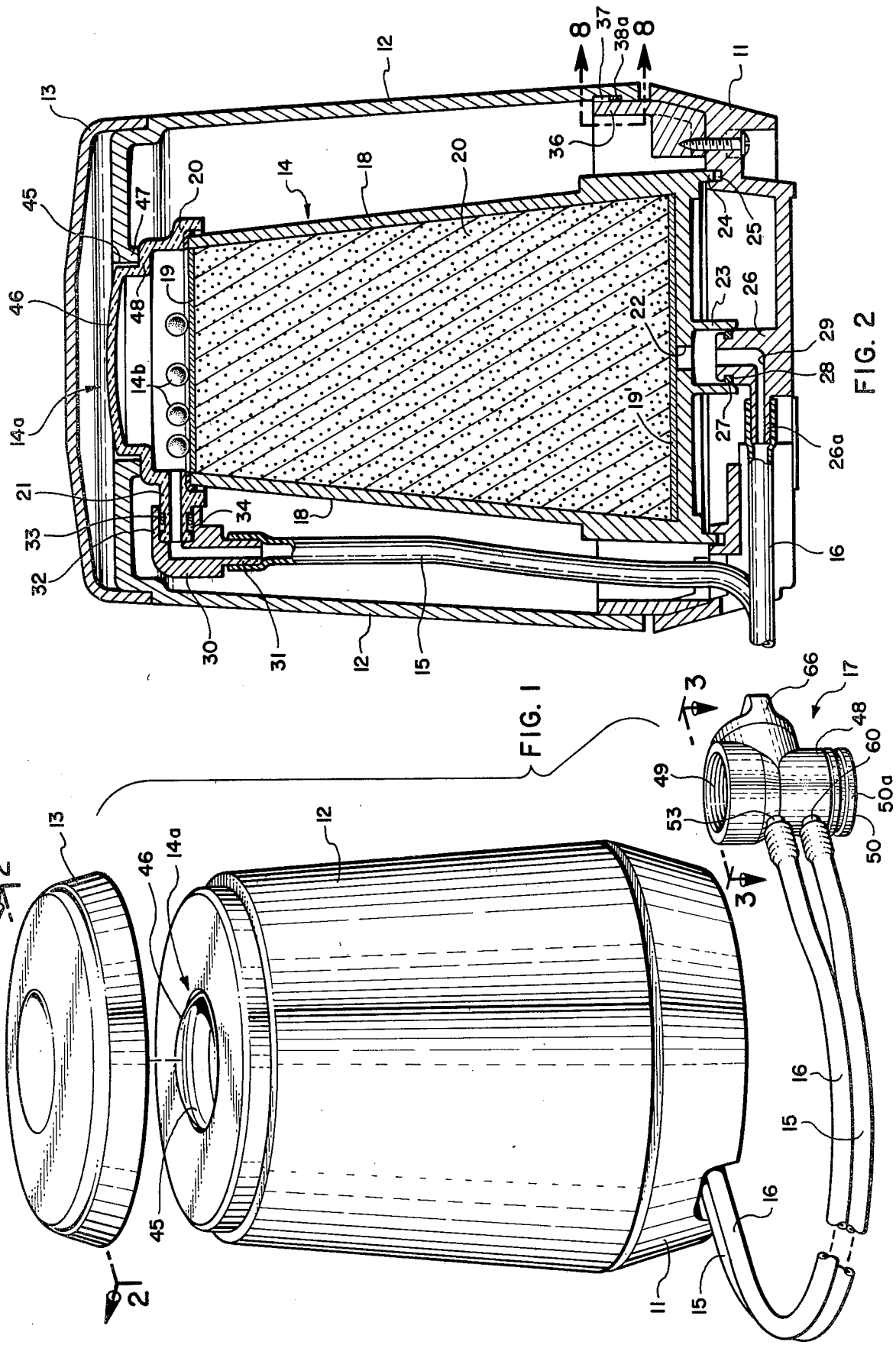

WATER TREATMENT APPARATUS

BRIEF DESCRIPTION OF THE INVENTION

1. Field of the Invention

This invention relates to devices adapted to be coupled to water faucets and to treat water distributed therethrough.

2. Prior Art

It is well known that filters of various types can be used in the treatment of water. It is also known that such filters may be made to be readily disposable and replaceable. It is further known that a valve can be connected to a water faucet to selectively divert the flow of water into or past the filter. The previously known water filter systems used to treat water from a faucet have been difficult to assemble and to the best of my knowledge have not provided an easy, essentially foolproof way of quickly changing the disposable filter. Futhermore, with other known devices it has not been possible to monitor the filter to determine whether or not it is fully operational and when replacement is necessary. Also, to the best of my knowledge there has not heretofore been available a valve for diverting the flow of water utilizing a valve stem with lands and grooves as the actuating mechanism. The integration of the components of the present invention provides for easy use of the water treatment apparatus and for easy and timely replacement of the disposable filter.

SUMMARY OF THE INVENTION

It is a principle object of the present invention to provide a water treatment apparatus where the filter and the housing are integrated into one functional unit while maintaining a quick and easy process of replacing the filter.

Another object of the present invention is to provide a simple, reliable valve attachable to a water faucet to divert the flow of water to the treatment apparatus or to bypass the apparatus.

Still another object of the invention is to provide a replaceable filter that can be readily monitored to determine whether or not the filter is fully operational while it is in use and to determine when replacement is necessary.

Principal features of the present invention in an integrated water treatment apparatus include a skirt projecting below the bottom surface of a filter cartridge to extend snugly into a ring-shaped recess in a housing base. When the filter cartridge is thus positioned on the housing base, a sleeve centrally located around the filter discharge opening telescopically extends around a central upstanding tube in the housing base. The central upstanding tube, in turn, is connected to a base discharge tube. The filter inlet tube is attached to the filter cartridge by a connecting tube. The connecting tube has a sleeved end which telescopes over a protruding filter inlet opening on the filter cartridge. This connection is sealed by an O-ring in a recess around the outer periphery of the filter inlet opening which contacts the inner periphery of the connecting tube sleeve.

The base, cover and filter cartridge are arranged to provide for easy replacement of the cartridge within the housing and to guarantee proper placement of the cartridge. Protrusions on the outer face of the base are mated with channels on an inner face of the cover to thereby properly position the cover over the base. Upon the application of a twisting motion to the cover, the base protrusions and the cover channels come into frictional contact so that the cover is locked to the base and the filter cartridge is held in place.

The replaceable filter is specially constructed with a transparent top cover and an impurity absorbing color changing membrane supporting light-weight floatable balls. The membrane is positioned above a body of conventional filter material such as granular activated charcoal, or the like, that is contained in the filter housing. The membrane is also spaced below the top cover so that the balls are free to move inside the top cover.

Additional objects and features of the invention will become apparent from the following detailed description and claims, taken together with the accompanying drawings.

THE DRAWINGS

In the drawings:

FIG. 1 is an exploded perspective view of the water treatment apparatus of the present invention, taken from slightly above and to one side;

FIG. 2, is a vertical sectional view taken on the line 2—2 of FIG. 1;

Figure 3:
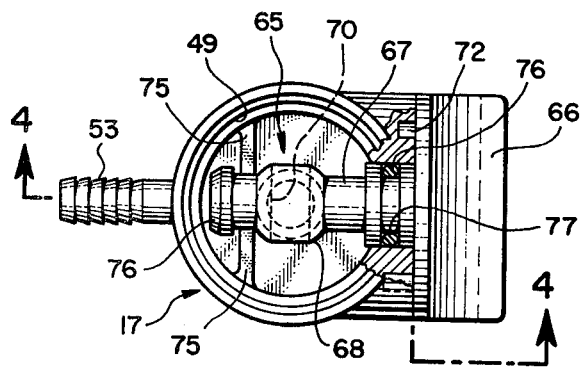
Figure 5:
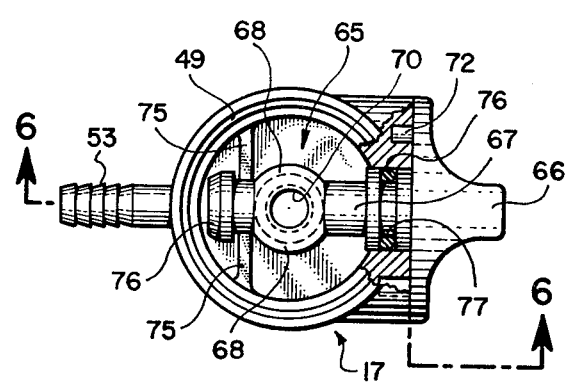
Figure 4:
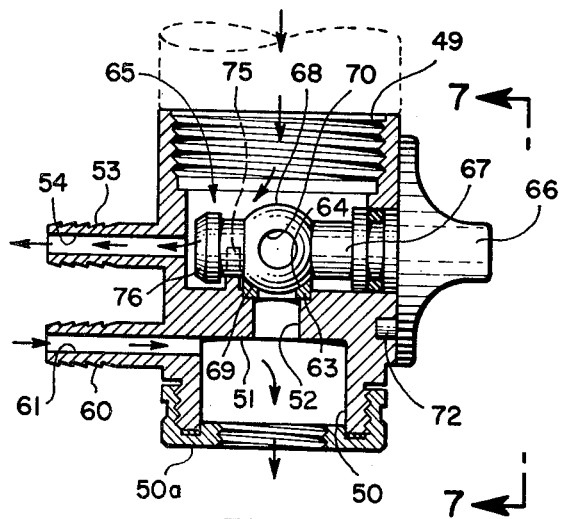
Figure 6:
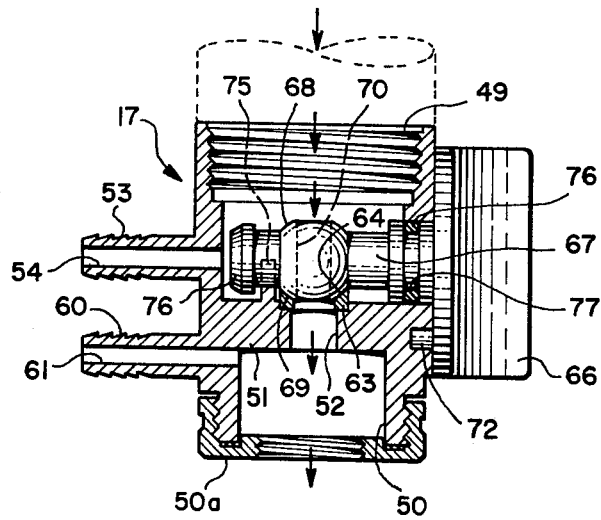
Figure 7:
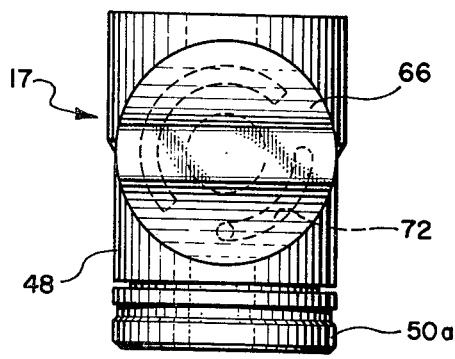

FIG. 3, a top plan view, partially broken away for clairty, showing the control valve of the invention in its flow through mode;

FIG. 4, a vertical sectional view taken on the line 4—4 of FIG. 3;

FIG. 5, a view like that of FIG. 3, but showing the valve in its diverting mode;

FIG. 6, a vertical sectional view taken on the line 6—6 of FIG. 5;

FIG. 7, an end elevational view of the valve; and

Figure 8:
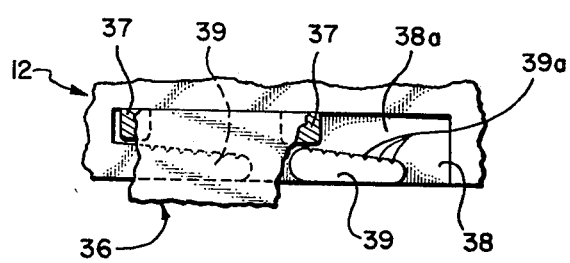

FIG. 8, an enlarged fragmentary view, taken on the line 8—8 of FIG. 2 and showing the means for locking the cover to the base.

DETAILED DESCRIPTION

Referring now to the drawings:

In the illustrated preferred embodiment, the water treatment apparatus shown generally at 10 includes a base 11, a housing 12, a housing cover 13, a disposable filter cartridge shown generally at 14 having a transparent top cover 14a, a flexible filter inlet tube 15, a flexible base discharge tube 16, and a valve unit 17.

As best shown in FIG. 2, the filter cartridge 14 is comprised of a casing 18, the transparent, curved top cover 14a, a top filter membrane 19, a filter medium 20, a filter inlet opening nipple 21 extending through a sidewall of the transparent top cover and above the membrane 19, a bottom filter membrane 19' beneath the filter medium 20, discharge opening 22 extending centrally through the bottom end of casing 18 below the bottom membrane 19', a filter sleeve 23 surrounding the discharge opening 22, and a ring-shaped skirt 24 projecting downward from the periphery of the casing 18. When mated with the base 11, the outermost portion of ring-shaped skirt 24 extends snugly into a circular groove 25 formed in the base 11 and the filter sleeve 23 telescopes over a central upstanding boss 26 to provide a sealing relationship between the central upstanding boss 26 and the filter sleeve 23. The base discharge tube 16 telescopes onto a nipple 26a of the boss 26 to connect the tube to passage 29 formed through the boss.

The filter medium 20 is a conventionally used material and may be granulated activated charcoal, for example. The top and bottom membranes 19 and 19' respectively are made of a suitable material that will filter water therethrough and the top membrane 19 is made to absorb impurities and to change color upon the absorption of the impurities. A felt fabric has been found suitable for use for both top and bottom membranes.

A plurality of lightweight floatable balls (made of polystyrene plastic or the like) are loosely positioned in the transparent top cover above the top membrane 19. The balls 14b will move in the top cover to an extent determined by flow through the top cover. Thus, an observer working through the top cover can determine the extent of flow through the filter cartridge as a guide to whether or not replacement of the filter cartridge is necessary or desirable.

As best shown in FIG. 2, the filter inlet tube 15 is connected to the protruding filter inlet opening nipple 21 by an elbow connector 30. The filter inlet tube is snugly telescoped over one end 31 of the elbow connector and the other end 32 of the connector is telescoped onto the nipple 21. A snug sealing relationship between the elbow connector 30 and the nipple 21 is provided by an O-ring 33 that is mounted in a recess 34 formed around the nipple. The use of the elbow connector 30 on the flexible filter inlet tube 15 provides for easy disconnection and attachment of the filter inlet tube to the nipple 21 as a filter cartridge is removed from and is replaced in the housing, as will be further explained hereinafter.

The filter cartridge 14 is held in its proper position when the housing 12 is locked to the base 11. This is accomplished by a housing retaining ring 36 that extends upwardly as part of base 11 and into the lower portion of housing 12. Lugs 37 project outwardly from ring 36 to move in slots 38 as the housing is positioned over the ring 36. Rotation of the housing will then move slots 38a (FIG. 8) formed in the housing and intersecting slots 38 with respect to the lugs 37. As the housing is rotated camming surfaces 39 on the housing inner wall move beneath the lugs 37 to cam the housing firmly to the base. Notches 39a in the camming surfaces engage the lugs to prevent undesired reverse twisting of the housing with respect to the base.

When the filter cartridge is properly positioned the end 32 of elbow connector 30 is fitted on nipple 21, the filter sleeve 23 fits over the boss 26, and the skirt 24 fits in the groove 25. The housing 12 is then placed over the filter cartridge and is locked to the base 11 as previously described. An opening 45 through the upper end of housing 12 fits around an upper portion 46 of the transparent top 14a and a downturned ring 47 at the opening 45 engages a shoulder 48 of the filter cartridge so that as the housing is turned with respect to the base and is cammed into locking engagement the ring 47 acts on shoulder 48 to force the ring 24 into groove 25 whereby a solid unit is formed between the base, filter cartridge and housing.

The opening 45 and transparent top cover 14a of the filter permit observation of the filter medium inside the filter cartridge. Thus by removing housing cover 13, an observer can easily determine when the top member 19 changes color or otherwise indicates that it should be changed. Similarly, a user can readily determine whether or not satisfactory flow through the unit is being maintained by observing the action of the floatable balls 14b located within the transparent top cover 14a and above the membrane 19. The curved configuration of the transparent top 14a, shown best in FIG. 2, together with the water filling the space between top 14a and the membrane 19 serves to magnify the membrane and collected particles therein to a viewer, so that the condition of the filter is even more easily observed.

In practice the filter cartridge is connected to a faucet such that flow can be diverted through the filter cartridge or will by-pass the filter cartridge. For this purpose the valve unit 17 is provided.

Valve unit 17 comprises a housing 48 having a threaded inlet opening 49 that is adapted to be threaded onto the end of a faucet. An exteriorly threaded discharge opening 50 of the valve unit 17 is aligned with the inlet opening 49, is separated therefrom by a partition 51 having a passage 52 therethrough, and may have a conventional aerator 50a threaded thereon.

A nipple 53, having a central bore 54, projects into the filter inlet tube 15 and connects the tube with the inlet opening 49 at one side of the partition 51. Another nipple 60, having a central bore 61, projects into the discharge tube 16 and connects the discharge tube with the discharge opening of the valve at the other side of the partition 51.

A shoulder 62 is formed at the inlet opening end of passage 52 and a ring-shaped valve seat 63 having a concave seating surface 64 is positioned on the shoulder.

A valve plug, shown generally at 65, includes an actuator handle 66 and a stem 67, extending from the handle and projecting into the housing 48 such that an enlarged circular valve head 68 formed on the stem will rest on the valve seat 63. The valve head is curved at 69 to conform to the seat and has a passage 70 therethrough.

A post 71 projects from handle 66 into an arcuate slot 72 formed in the valve housing 48. The slot 72 permits rotation of the handle 66 and attached stem 67 so that the valve head is turned between a first position wherein passage 70 is aligned with the inlet opening 49, discharge opening 50, and passage 52, and a second position wherein the passage 70 extends transversely to the passage 52. With the valve head in the first position flow from a faucet to which the inlet opening 48 is attached is directed primarily through passages 70 and 52 to the outlet opening 50. Some flow may be diverted through the bore 54, tube 15, the filter cartridge 14, tube 16 and bore 61 to the outlet opening 50. With the valve head in the second position all flow from the inlet opening 49 is directed through bore 54, tube 15, filter cartridge 14, tube 16, and bore 61 to the outlet opening 50. Thus, with the valve head in the second position impurities are removed by the filter cartridge from all of the water exiting the faucet.

The stem 67 is held in the housing 14 by a yoke 75 that projects upwardly from the partition to partially surround the stem and by an enlarged head 76 at the innermost end of the stem. The head 76 contacts the yoke 75 to keep the stem 67 from being pulled from the housing. An O-ring seal 76, fitted in a groove 77 of the stem 67 sealing engages the wall of housing 11 to prevent flow past the stem and out of the housing.

Although a preferred embodiment of my invention has been herein disclosed, it is to be understood that the present disclosure is by way of example and that variations are possible without departing from the subject matter coming within the scope of the following claims, which subject matter I regard as my invention.

I claim:

1. A water treatment apparatus comprising
   a housing including a base having a flexible discharge tube connected thereinto and a flexible inlet tube extending therethrough, and a cover having a viewing opening in one end thereof, said base and said cover having mating locking means thereon to interlock said cover to said base;

a disposable filter cartridge having a casing with a transparent top cover;

a filter element in said casing, spaced from said transparent top cover;

a filter inlet opening nipple projecting from the casing between the filter element and below the transparent top cover;

a discharge opening from the casing below the filter element;

means positioning the filter cartridge to the base whereby the discharge opening is coupled to the flexible base discharge tube;

means coupling the protruding filter inlet opening to the flexible filter inlet tube;

means on the cover for securing the filter cartridge to the base when the cover is locked to the base whereby the transparent top cover of the filter cartridge is visible through the viewing opening of the cover; and valve means for directing a flow of water through said flexible inlet tube, said filter cartridge, said flexible base discharge tube and back through said valve means to be discharged therefrom.

2. Apparatus as in claim 1, wherein the disposable filter element includes replacement indicator means comprising a flat membrane and wherein the transparent top cover is curved whereby the flat membrane is magnified when viewed through the top cover and water between the top cover and the flat membrane.

3. Apparatus as in claim 2 further including means for indicating the extent of water flow through the filter cartridge said means comprising lightweight floatable balls loosely spaced between the transparent top cover and the replacement indicator means.

4. A replaceable filter cartridge for use in water treatment apparatus comprising a solid wall casing;

a transparent top cover having a central raised curved portion closing one end of the casing;

a bottom wall closing the opposite end of the casing, said bottom wall having a central discharge port therethrough and a filter sleeve surrounding said port and projecting away from said casing;

a bottom filter membrane extending across the discharge port inside the casing;

a top filter membrane extending across the casing and spaced from the central raised portion of the transparent top cover;

a filter inlet tube connected into the space formed between the top filter membrane and the central raised portion of the transparent top cover and projecting outwardly of the transparent curved top cover;

a plurality of lightweight, floatable balls in the space formed between the top filter membrane and the central raised portion of the transparent top cover; and granulated filter material in the casing between the top and bottom filter membranes.

* * * * *